(12) United States Patent
Markowski et al.

(10) Patent No.: US 11,586,795 B2
(45) Date of Patent: Feb. 21, 2023

(54) MODULAR PRINTED CIRCUIT BOARD ENCLOSURE

(71) Applicant: The Government of the United States of America, as represented by the Secretary of the Navy, Arlington, VA (US)

(72) Inventors: Blerta Bajramaj Markowski, Springfield, VA (US); Brian Carl Hicks, Alexandria, VA (US); David Bonanno, Fairfax Station, VA (US); Freddie Santiago, Fort Washington, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/150,622

(22) Filed: Jan. 15, 2021

(65) Prior Publication Data
US 2022/0229964 A1   Jul. 21, 2022

(51) Int. Cl.
*G06F 30/30* (2020.01)
*G06F 30/392* (2020.01)
*G06F 30/394* (2020.01)
*H05K 3/00* (2006.01)
*H05K 5/02* (2006.01)

(52) U.S. Cl.
CPC .......... *G06F 30/392* (2020.01); *G06F 30/394* (2020.01); *H05K 3/0005* (2013.01); *H05K 5/0256* (2013.01)

(58) Field of Classification Search
CPC ... G06F 30/392; G06F 30/394; H05K 3/0005; H05K 5/0256
USPC .......................................................... 716/119
See application file for complete search history.

(56) References Cited

U.S. PATENT DOCUMENTS

| | | | | |
|---|---|---|---|---|
| 5,448,496 A | * | 9/1995 | Butts | G06F 30/331 716/116 |
| 8,230,383 B2 | * | 7/2012 | Krebs | G06F 30/00 716/137 |
| 2008/0052435 A1 | * | 2/2008 | Norwood | H05K 7/1478 710/301 |
| 2020/0289026 A1 | * | 9/2020 | Bardy | A61B 5/1112 |

* cited by examiner

*Primary Examiner* — Jack Chiang
*Assistant Examiner* — Brandon Bowers
(74) *Attorney, Agent, or Firm* — US Naval Research Laboratory; Hong-Vinh Nguyen

(57) ABSTRACT

Systems and methods are provided for a turnkey modular printed circuit board enclosure that is generated using a template generator. The template generator accepts a user input comprising an enclosure parameter, based on which a manufacturing file may be generated. The manufacturing file may be provided to a fabricator for fabricating the enclosure or the manufacturing file may be modified in a printed circuit board design environment to incorporate a printed circuit board into the enclosure. The printed circuit board may be a separate printed circuit board that is inserted into the enclosure or it may be embedded in a face of the enclosure.

9 Claims, 12 Drawing Sheets

500

```
1   G04 Layer_Color=8388736*
2   %FSLAX25Y25*%
3   %MOIN*%
4   G70*
5   G01*
6   G75*
7   %ADD10C,0.01000*%
8   %ADD11C,0.00800*%
9   D10*
10  X-110000Y-10500D02*
11  Y41500D01*
12  X1000Y-500D02*
13  Y41500D01*
14  X-5000D02*
15  X1000D01*
16  X-5000D02*
17  Y84500D01*
18  X-117000Y84500D02*
19  X-61000D01*
20  X-117000Y41500D02*
21  Y84500D01*
22  Y41500D02*
23  X-110000D01*
24  Y-10500D02*
25  X-61000D01*
26  Y-500D01*
27  X1000D01*
28  X-60000Y84500D02*
29  X-5000D01*
30  X-60000Y84500D02*
31  Y84500D01*
32  X210000Y84500D02*
33  Y93500D01*
34  X209000Y84500D02*
35  X210000D01*
36  Y93500D02*
37  X259000D01*
```

FIG. 5

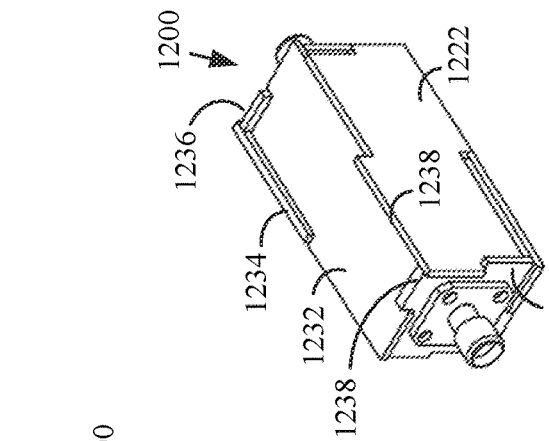
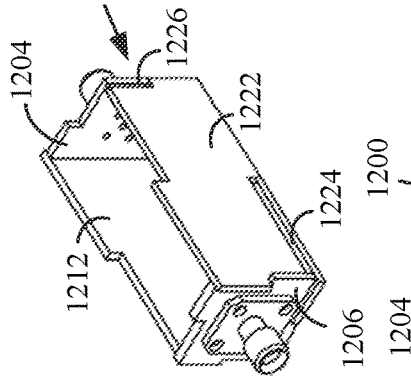
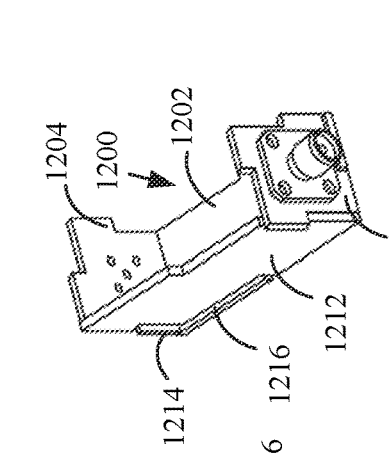
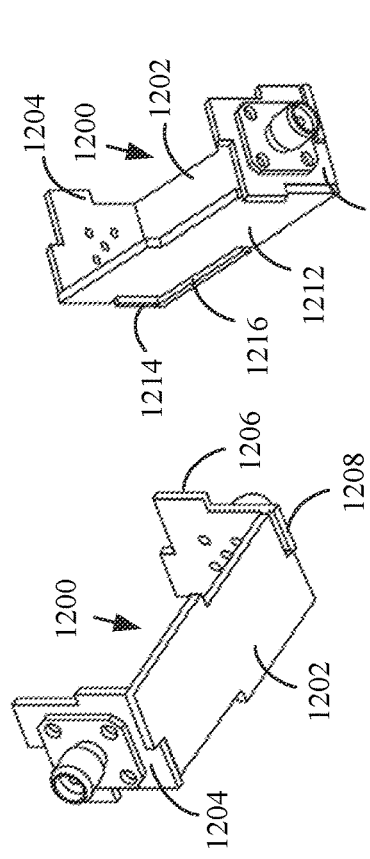
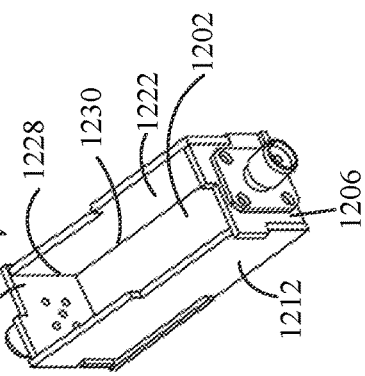
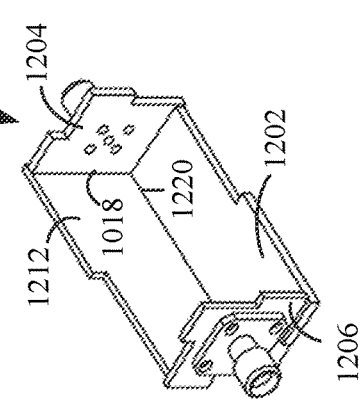
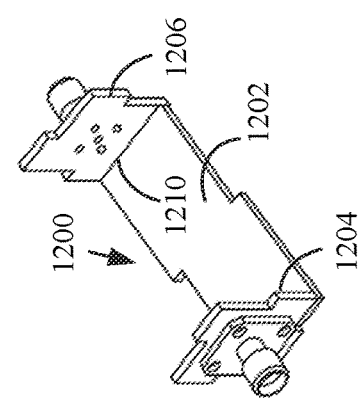

MODULAR PRINTED CIRCUIT BOARD ENCLOSURE

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case Number 109419-US1.

BACKGROUND

To ensure successful operation, it is important to have the right enclosure for an electronic device that has electrical or electronic components, for example, those that are on a printed circuit board (PCB). There are some challenges to finding or designing the right enclosure for a PCB.

Current methods for obtaining PCB enclosures include purchasing, in-house manufacturing, additive manufacturing, or hobby PCB designs. These methods suffer from various limitations. For example, with purchasing, standard or customized enclosures may be available but they have to be purchased separately and precisely modified (e.g., drilling holes for mounting the PCB and connectors) to fit the PCB. In addition, customization of commercial enclosures may be costly and may require long lead time. For in-house manufacturing, specialized equipment and tools may be required. With additive manufacturing, printing equipment and sometimes material curing are required. Moreover, most materials do not provide adequate electromagnetic interference shielding. With hobby designs, hardware may be required to assemble the enclosure and no manufacturable design or template is available.

One method for incorporating a PCB into an enclosure is to design and fabricate the circuit board as one entity and the enclosure as another, separate entity. As such, the designer must focus on the PCB or the enclosure separately. For example, the designer may design the PCB first and then consider the enclosure second, thereby facing issues in sourcing the best fit enclosure solution. Moreover, a complex PCB design may make it difficult to assemble electronic and mechanical components in an enclosure that is not specifically designed for that PCB. Additional time and funds may be needed for third party fabrication if in-house fabrication is not an option.

Another method is to outsource the design and fabrication of the whole unit, including the PCB and the enclosure, to a specialized third party. However, this method is time consuming and costly to implement. Any time the designer is faced with a customized circuit board or enclosure build, time of delivery and price of fabrication increases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described herein that provide for a turnkey modular printed circuit board enclosure. A template generator script may be utilized to generate an enclosure template and an associated manufacturing file. The template provides a footprint for a shielded, rigid structure that requires few assembly steps and a relatively short acquisition time. The manufacturing file may be provided to a fabricator for fabricating the enclosure. The manufacturing file may also be modified in a circuit board design environment to incorporate a printed circuit board into the enclosure. The printed circuit board may be a separate printed circuit board that is inserted into the enclosure or it may be embedded in a face of the enclosure.

A method for producing a modular printed circuit board enclosure is described herein. The method includes inputting an enclosure parameter into a template generator to generate a manufacturing file associated with an enclosure template. Based upon determining that the manufacturing file is to be modified to incorporate a printed circuit board into the enclosure, the method further includes importing the manufacturing file into a printed circuit board design environment; generating a modified manufacturing file based on information relating to a printed circuit board; and providing the modified manufacturing file to a fabricator for fabricating the enclosure.

A modular printed circuit board enclosure is also described herein. The enclosure comprises a first face having an integrated circuit layout of a printed circuit board. The first face includes a dimension that is dependent on a dimension of the printed circuit board, and a portion of exposed metal configured to accommodate a solder fillet. The solder fillet is configured to provide continuous grounding and structural integrity for the enclosure.

A method in a computer device is also described herein. The method includes receiving a user input that comprises an enclosure parameter for producing a printed circuit board enclosure. The method further includes automatically generating a manufacturing file based on the enclosure parameter. The manufacturing file is configured to be provided to a fabricator for fabricating the enclosure. The manufacturing is further configured to be modifiable in a printed circuit board design environment to incorporate a printed circuit board into the enclosure.

BRIEF DESCRIPTION OF THE DRAWINGS

FIG. 5 depicts an example manufacturing file.

FIGS. 12A-12G depict assembly stages of an enclosure, according to an embodiment.

Figure 1:
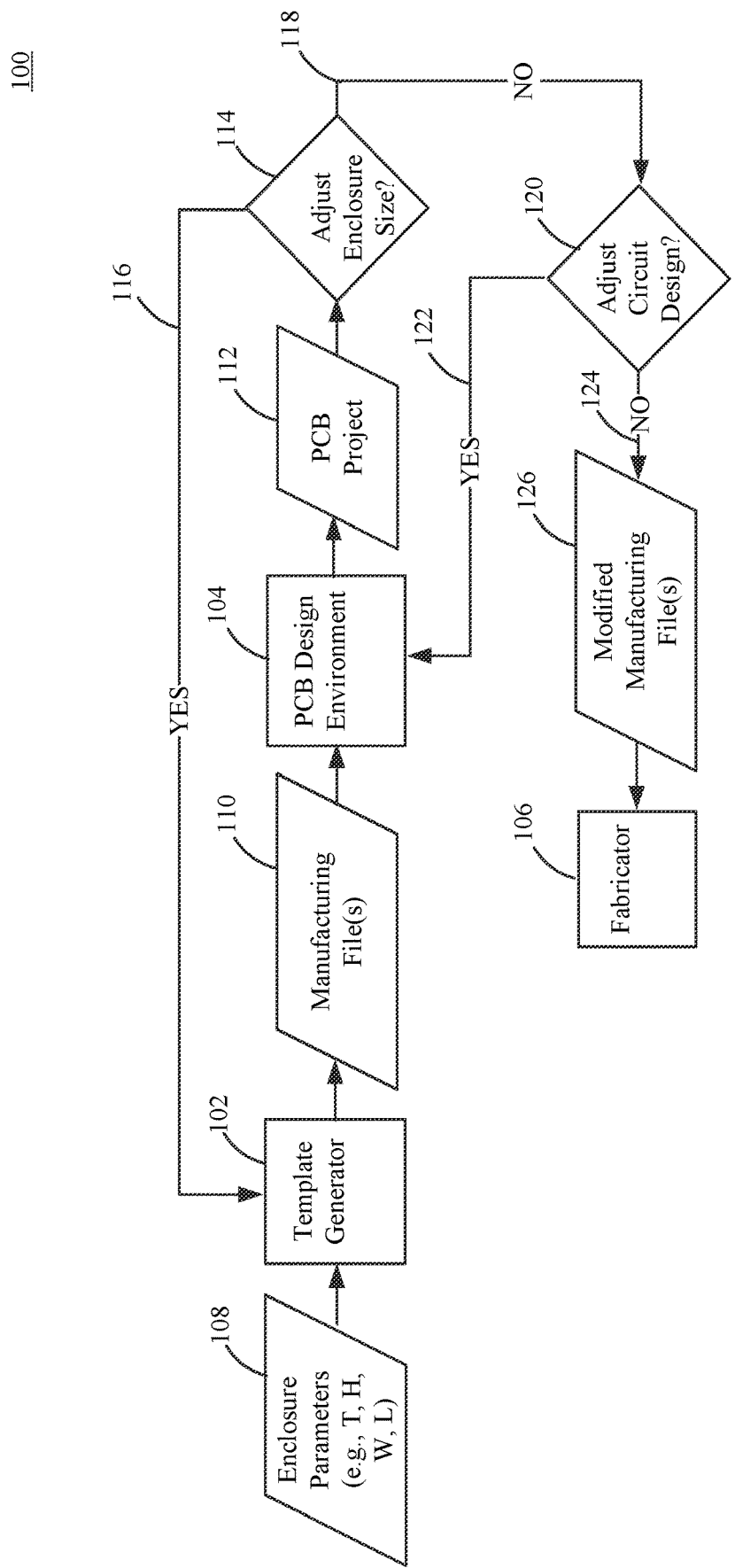
FIG. 1 shows a system for producing a printed circuit board enclosure, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

References in the specification to "one embodiment," an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Terminology

The terminology used in the specification is for the purpose of describing particular embodiments, and is not intended to be limiting. In the description of the embodiments and the claims, the following terminology will be used in accordance with the definition set out below.

As used herein, the singular forms "a," "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Embodiments for producing a turnkey, modular PCB enclosure are described herein. A script generated template for designing and manufacturing the PCB enclosure is provided. Such a script is dynamic in nature and may automatically generate any number of enclosure templates based on a few user inputs. The enclosure template provides a footprint for a shielded, rigid structure that requires fewer assembly steps and shorter acquisition time than enclosures made using current approaches. One or more circuit boards may be incorporated into the enclosure. A circuit board may be incorporated into the enclosure as a separate circuit board to be inserted into the enclosure using pre-drilled mounting holes or as an embedded circuit layout on a face of the enclosure. The need for two separate entities (a circuit board and an enclosure) is eliminated when a circuit layout is etched into the face of the enclosure, thereby reducing the size and weight of the finished product. This reduction in size and weight may be more significant when multiple circuit layouts are embedded.

The enclosure may be produced economically and in a time efficient manner. The enclosure template may be automatically generated given a few enclosure parameters (e.g., height, width, length and thickness of the PCB). The designer is provided the flexibility to simultaneously design a circuit layout and build an enclosure that adheres to the circuit layout specifications. That is, the incorporation of the actual circuit and the enclosure may be made at the same time as a package, with the same fabricator instead of separate entities made by different fabricators. Thus, errors made during the design and fabrication process may be reduced or eliminated.

In addition, the enclosure design technique allows for easy customizations, a clear advantage over off-the-shelf components that are commercially available for purchase. Other benefits of the enclosure include shielding, maximizing usage of the PCB layout area with simple designs, interlocking sides that may be structurally set in place with solder fillets, and accommodating towards different types of input and output connectors. Moreover, the assembly of the enclosure described herein requires no drilling or cuts, thereby simplifying the overall design and build effort.

Furthermore, the technique described herein is quite useful for rapid prototyping of PCB/enclosures. This technique enables PCB/enclosures to be produced in an environmentally conscious manner, as it completely eliminates the need to produce and recycle an enclosure.

Example Embodiments

A typical PCB design process may begin with a block diagram that shows a functional view of how a circuit or system works. Using PCB design software, the block diagram may be translated to a set of schematics that show a component-level view of the system. Finally, the schematics may be transformed into a circuit layout that shows the design in terms of planar geometric shapes that correspond to patterns of different layers (e.g., PCB layers, silkscreen, mechanical) that make up the components of the system. A standard multilayer PCB may include several copper clad boards stacked and fused together as a substrate. Common types of PCB material include glass epoxy or FR-4, where the FR stands for flame retardant and the number 4 indicates a flammability level. Other material may be used for PCBs, including polyimide, Teflon®, or polyether ether ketone (PEEK) used in flexible boards. The PCB layers may include signal layers used for placement of components and routing; internal planes for arrangement of power lines and ground wires; mechanical layers used to place information about the board and assembly methods; solder mask layers usually applied to copper traces for protection against oxidation and to prevent accidental contact with other metal, solder, or conductive material; screen printing layers used to draw the outline of components, the number of components placed or other textual information, etc.

In an embodiment, a PCB may be designed prior to the designing of the enclosure for such PCB, thereby providing the designer with some information about the PCB. Such PCB information may include board dimensions, connector requirements, how PCB should be incorporated into an enclosure, etc. In an alternative embodiment, the enclosure may be designed first, and the PCB may be designed to fit into the enclosure. Regardless whether the PCB or the enclosure is designed first, the designer may make changes to each as necessary throughout the design process.

A PCB enclosure may be produced in various ways in embodiments. For instance, FIG. 1 shows a system 100 for producing a printed circuit board enclosure, according to an embodiment. As shown in FIG. 1, system 100 includes a template generator 102, a PCB design environment 104, and a fabricator 106. System 100 is described as follows.

Template generator 102 may be a compiled or an interpreted general purpose computer language script (e.g., Python®) configured to accept a user input 108 and output a manufacturing file 110. The template script may render a graphical user interface (GUI) to enable designer interactions, although such a GUI is not necessary in order to accept user input 108. User input 108 may include information about a PCB and/or a PCB enclosure, including one or more of a PCB thickness (T), a height (H) of the enclosure, a circuit design board width (W), and a circuit design board length (L). The height may be an independent parameter that is selected by the designer. The height may account for the height clearance of parts on the circuit that is to be incorporated into the enclosure. The height may also depend on other requirements and factors, such as to minimize the size of the enclosure or to yield a specific form factor. Template generator 102 may use one or more parameters to generate a template that provides a footprint or layout for a rigid structure once assembled. The template may have interlocking sides that may be structurally set in place with solder. Based on the material (e.g., metal) selected, the shapes of the faces of the enclosure, the solder placement, the enclosure may have all-around continuous grounding and electromagnetic interference shielding. In an embodiment, the template includes four sides identical in shape and two sides that are the same in shape to form a six-sided rigid enclosure structure after assembly. The template may also be designed to maximize usage of the PCB layout area of a standard panel. In an embodiment, each face of the enclosure may accommodate one or more PCB to be etched onto the face, mounting holes to accommodate a separate PCB, or one or more connectors (e.g., input and output connectors) of any type (e.g., SMA (SubMiniature version A) or BNC (Bayonet Neill-Concelman)).

Conventionally, a designer may have to use a PCB design software to manually enter information about a PCB/enclosure in order to design a schematic/layout for it. This is a time-consuming and error-prone process, as one design is created at a time. In contrast, template generator 102 is dynamic in nature, as it may automatically generate any number of enclosure templates based on a few user inputs. Moreover, template generator 102 is configured to account for panel sizes and the maximum layout area available for a PCB, making sure endpoints line up correctly from one panel to the next, etc. Thus, template generator 102 enables a quick customizing process that is largely error-free.

The template generated by template generator 102 may be captured and output as manufacturing file 110, which may include one or more Gerber files and NC (Numeric Controlled) drill files. Gerber files are open ASCII (American Standard Code for Information Interchange) vector format files that include information about each physical board layer of a PCB design. Objects on the PCB, such as copper traces, vias, pads, solder mask, silkscreen images, etc., may be presented by a code and defined by a series of vector coordinates. These files may be used by PCB manufactures/fabricators to translate the details of the PCB design into physical properties of the PCB. NC drill files include information about drill holes, specifically the location and size of each drill hole. These drill holes are configured for screws to be inserted for board mounting purposes.

Referring back to FIG. 1, PCB design environment 104 may be a set of tools based on a computer-aided design program (e.g., Altium Designer®, KiCad) that enables a designer to design schematics for circuits and convert them to PCB designs. PCB design environment 104 is configured to receive or import manufacturing file 110 generated by template generator 102 to enable further modification of manufacturing file 110. PCB design environment 104 may facilitate the incorporation of a PCB board into the enclosure template associated with manufacturing file 110. For example, PCB design environment 104 may enable a designer to embed a PCB layout onto one of the faces of the enclosure template. As another example, PCB design environment 104 may enable a designer to indicate mounting holes on the enclosure template to facilitate a separate PCB to be inserted later. PCB design environment 104 is configured to output a PCB project file 112 that has information of both the enclosure (enclosure template) and the PCB (PCB layout or mounting holes) as well as any connector information. PCB project file 112 may be one or more design documents required to manufacture the PCB/enclosure.

During the design process, changes may need to be made to the enclosure. For example, as shown in FIG. 1, a determination 114 is made as to whether an adjustment to the enclosure size is needed. If such adjustment is needed, as shown in FIG. 1 by decision 116, the adjustment may be provided to template generator 102 to update manufacturing file 110. If no further enclosure adjustment is needed, as shown in FIG. 1 by decision 118, a determination 120 is made as to whether an adjustment to the circuit design is needed. If such an adjustment is needed, as shown in FIG. 1 by decision 122, the adjustment may be provided to PCB design environment 104 to update PCB project file 112. The adjustment of the enclosure and/or the circuit design may be repeated as long as necessary to perfect the PCB/enclosure design. Once it is determined that no more adjustments are needed, as shown in FIG. 1 by decision 124, a final modified manufacturing file 126 may be generated and provided to fabricator 106. In embodiments, more than one modified manufacturing files may be generated.

Fabricator 106 may be any entity that is capable of producing or fabricating a PCB and/or a PCB enclosure based on information provided by the designer, such as modified manufacturing file 126. Fabricator 106 may be an in-house fabricator or a commercial manufacturer of PCBs and/or enclosures. In an embodiment, if no modification to manufacturing file 110 is needed (e.g., no incorporation of a PCB), manufacturing file 110 may be provided to fabricator 106. Conventionally, manufacturing files may be generated by a PCB design software package (e.g., PCB design environment 104 of FIG. 1). However, in embodiments, such manufacturing files may be directly generated by template generator 102 and provided to fabricator 106.

Figure 2:
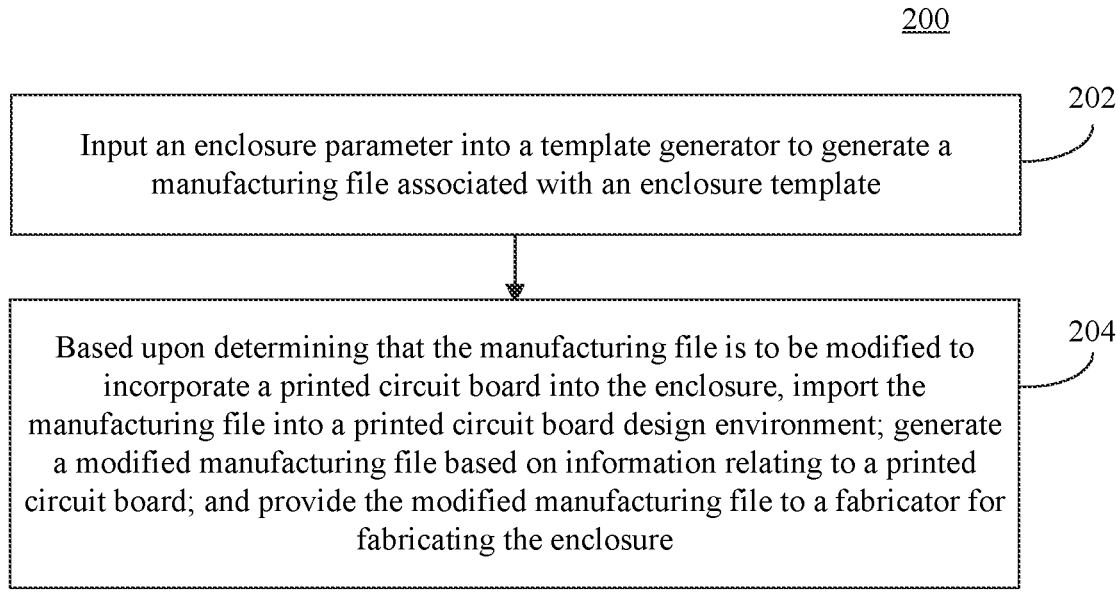
FIG. 2 depicts a flowchart providing a process for producing a modular printed circuit board enclosure, according to an embodiment.

The enclosure described herein may be produced in various ways, in embodiments. For instance, FIG. 2 depicts a flowchart 200 for a method for producing a modular printed circuit board enclosure. Flowchart 200 may be implement in any system, for example, system 100 as shown in FIG. 1. Thus, flowchart 200 will be described in reference to system 100. The steps of flowchart 200 may be performed in an order different than shown in FIG. 2 in some embodiments. Furthermore, more or fewer steps may be performed in embodiments.

Flowchart 200 begins with step 202. In step 202, an enclosure parameter is input into a template generator to generate a manufacturing file associated with an enclosure template. In an embodiment, the manufacturing file may be generated by template generator 102 shown in FIG. 1. Multiple manufacturing files may be generated in this step. User input provided in this step may include one or more enclosure parameters related to the enclosure or connectors. For example, the enclosure specifications may include a PCB thickness; an enclosure length; an enclosure width; an enclosure height; a mounting holes number; an input connector number; an output connector number. In addition, the connector specifications may include an input connector number; an output connector number; an input connector type; or an output connector type. Other information may be provided by the designer to further customize the enclosure.

In step 204, based on determining that the manufacturing file is to be modified to incorporate a printed circuit board into the enclosure, the manufacturing file is imported into a printed circuit board design environment, a modified manufacturing file is generated based on information relating to a printed circuit board, and the modified manufacturing file is provided to a fabricator for fabricating the enclosure. The designer may determine whether the manufacturing file is to be modified to incorporate a printed circuit board. In an embodiment, manufacturing file 110 shown in FIG. 1, may be automatically imported into PCB design environment 104. For example, template generator 102 may provide the designer with an option to send manufacturing file 110 to a particular PCB design package. The selection of the PCB design package may be made by template generator 102 (e.g., based on the PCB design package available within the same machine or network) or by the designer specifying the desired PCB design package. Alternatively, the designer may open manufacturing file 110 within PCB design environment for further modification.

Within PCB design environment 104, the designer may start a new PCB design or select a previously designed PCB to incorporate into the enclosure template. In an embodiment, based on information relating to the PCB, manufacturing file 110 may be modified to generate PCB project file 112 as shown in FIG. 1. In an embodiment, the manufacturing file may be modified to include indicating mounting points on a face of the enclosure corresponding to mounting points on the PCB that is to be inserted into the enclosure post fabrication. For example, manufacturing file 110 may be modified in PCB design environment 104 to include mounting points on a face of the enclosure corresponding to mounting points on the PCB that is to be inserted into the enclosure after it has been fabricated, e.g., during the assembly stage. In another embodiment, the manufacturing file may be modified to embed a circuit layout of the PCB onto an internal face of the enclosure. For example, manufacturing file 110 may be modified in PCB design environment 104 to include an embedded circuit layout in an internal face of the enclosure, resulting in PCB project file 112.

Manufacturing file 110 and PCB project file 112 may be modified as often as needed to include any adjustments made to the enclosure size and/or circuit design. For example, a change in a dimension of the enclosure may be provided to template generator 102 to modify manufacturing file 110. As another example, a change in a dimension of the PCB may be provided to PCB design environment 104 to modify PCB project file 112. After all the adjustments are made, modified manufacturing file 126 may be generated and provided to fabricator 106 to fabricate the PCB/enclosure. Information relating to multiple circuits, embedded or inserted, as well as connectors may be used to modify manufacturing file 110 and PCB project file 112.

In an embodiment, the fabricated enclosure includes a matrix that includes a plurality of pieces with routing guidelines between the pieces, each piece corresponding to a face (e.g., side or end pieces) of the enclosure. A matrix is an array of PCBs/enclosure pieces. The enclosure described herein may be designed to maximize the usage of the PCB/enclosure layout area to secure the benefit of running multiple pieces through the manufacturing processes while yielding the maximum number of pieces from the fabricator's standard processing panel. For example, for a standard panel of 18×24 inches, the fabricator might need a perimeter clearance (e.g., ½ inch to 1 inch) for handling the panels during processing, yielding about 16×22 or 17×23 inches of usable panel space. The fabricator may also need about 0.1 inch of routing space between the arrays, rendering this space unusable. In addition, every cut or routing guideline in the array that is made to facilitate future breakout of the pieces may weaken the panel. Thus, the pieces may be uniform in shapes and sizes or may include different shapes and sizes. The enclosure designs described herein include simple designs that avoid array weakness while maximizing the usage of the layout area.

In an embodiment, the fabricated enclosure is assembled by separating the plurality of pieces from the matrix along the routing guidelines and soldering the pieces together with solder fillet to form the enclosure as a three-dimensional shielded structure. The solder fillet may provide all-around continuous grounding and structural integrity for the enclosure. For example, the pieces in the matrix may be separated by grooves (e.g., V-grooves) and/or perforated tabs designed for manual separation. Once the pieces are separated, they may be manually assembled together with solder to form a three-dimensional structure. This structure is a shielded structure that minimizes electromagnetic interference because of the material used for the sides and solder configuration for setting the sides in place. Solder fillet is a concave-surface of solder that is typically placed at intersections of the metal surfaces of a solder connection. For example, such solder fillet may form contact with the exterior (e.g., bottom) and interior (e.g., top) sides of an enclosure piece in the three-dimensional structure, thereby providing all-around continuous grounding. The solder fillet also serves as a bonding mechanism to hold the pieces of the enclosure together. The assembly of the enclosure does not require any drilling or cuts. Furthermore, basic tools and supplies, such as a soldering iron and solder wire, may be used to assemble the enclosure.

In an embodiment, the enclosure may be made of any material, such as metal (e.g., tin, copper, plated copper) or non-metal material. For instance, metal may be a durable, inexpensive material of choice for the enclosure, while plastic may be easier to shape and is resistant to corrosion. Metallic enclosures may hinder transmission of wireless signals, yet some devices may need to be enclosed in metal for different reasons, such as environmental concerns. Many techniques may be used to facilitate wireless signal transmission with metal enclosures, such as a incorporating a window (e.g., gap, slit) may into the enclosure to allow antenna to radiate without disruption; or incorporating an antenna or antenna lines into the enclosure, etc. In an embodiment, a PCB based antenna may be placed on an exterior surface of the enclosure. Any suitable antenna may be utilized, such as a PCB trace antenna, an external whip antenna with an SMA connector, a wire monopole antenna, chip antenna, etc. The PCB based antenna may be useful for wireless communication applications (e.g., Bluetooth®, Wi-Fi®, and Zigbee®).

Figure 3:
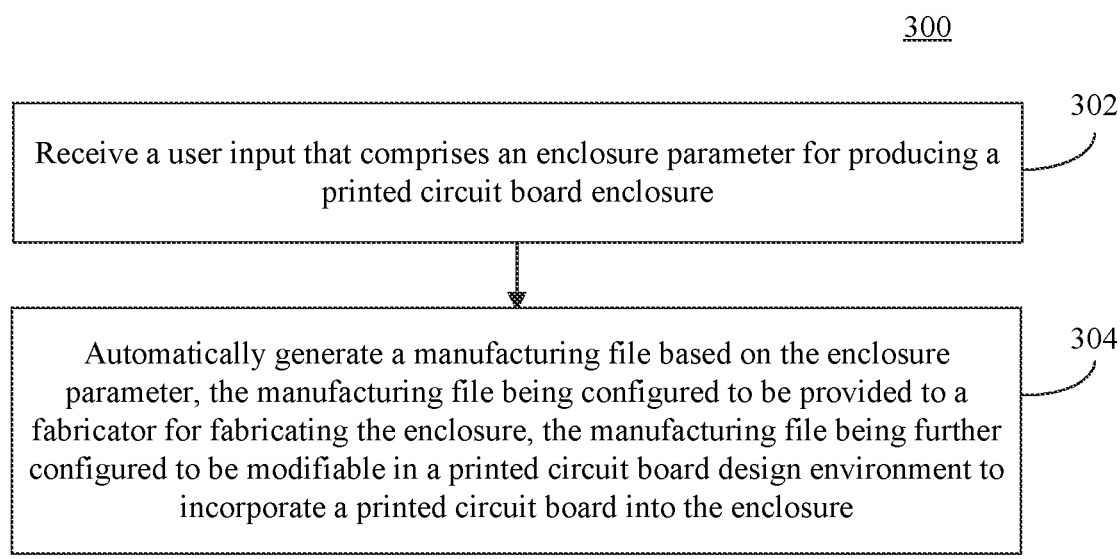
FIG. 3 depicts another flowchart providing a process for generating a manufacturing file usable to fabricate a modular printed circuit board enclosure, according to an embodiment.

Template generator 102 may operate in various ways to generate manufacturing file 110. In embodiments, template generator 102 may operate according to FIG. 3. FIG. 3 depicts flowchart 300 providing a process for generating a manufacturing file usable to fabricate a modular PCB enclosure that may be implemented in a computing device. Flowchart 300 and template generator 102 are described as follows with respect to FIGS. 1 and 3.

Template generator 102 may include components, such as, a graphical user interface renderer, a user input collector, and a manufacturing file generator. Flowchart 300 begins with step 302. In step 302, a user input that comprises an enclosure parameter for producing a printed circuit board enclosure is received. For example, the user input collector of template generator 102 may receive an enclosure parameter (e.g., T, H, W, L) from a user. Multiple enclosure parameters may be received. The user input may also include any information usable to generate the enclosure, such as connector information. The user input may be provided to template generator 102 via a graphical user interface rendered by the graphical user interface renderer. In some embodiments, no graphical user interface is generated and user inputs may be received by other means.

In step 302, a manufacturing file is automatically generated based on the enclosure parameter. The manufacturing file is configured to be provided to a fabricator for fabricating the enclosure. The manufacturing file is further configured to be modifiable in a printed circuit board design environment to incorporate a printed circuit board into the enclosure. For example, the manufacturing file generator of template generator 102 may automatically generate manufacturing file 110 based on the enclosure parameter 108 and any other information received. As described in reference to FIGS. 1 and 2, manufacturing file 110 may be modifiable in a printed circuit board design environment to incorporate a printed circuit board into the enclosure.

Figure 4:
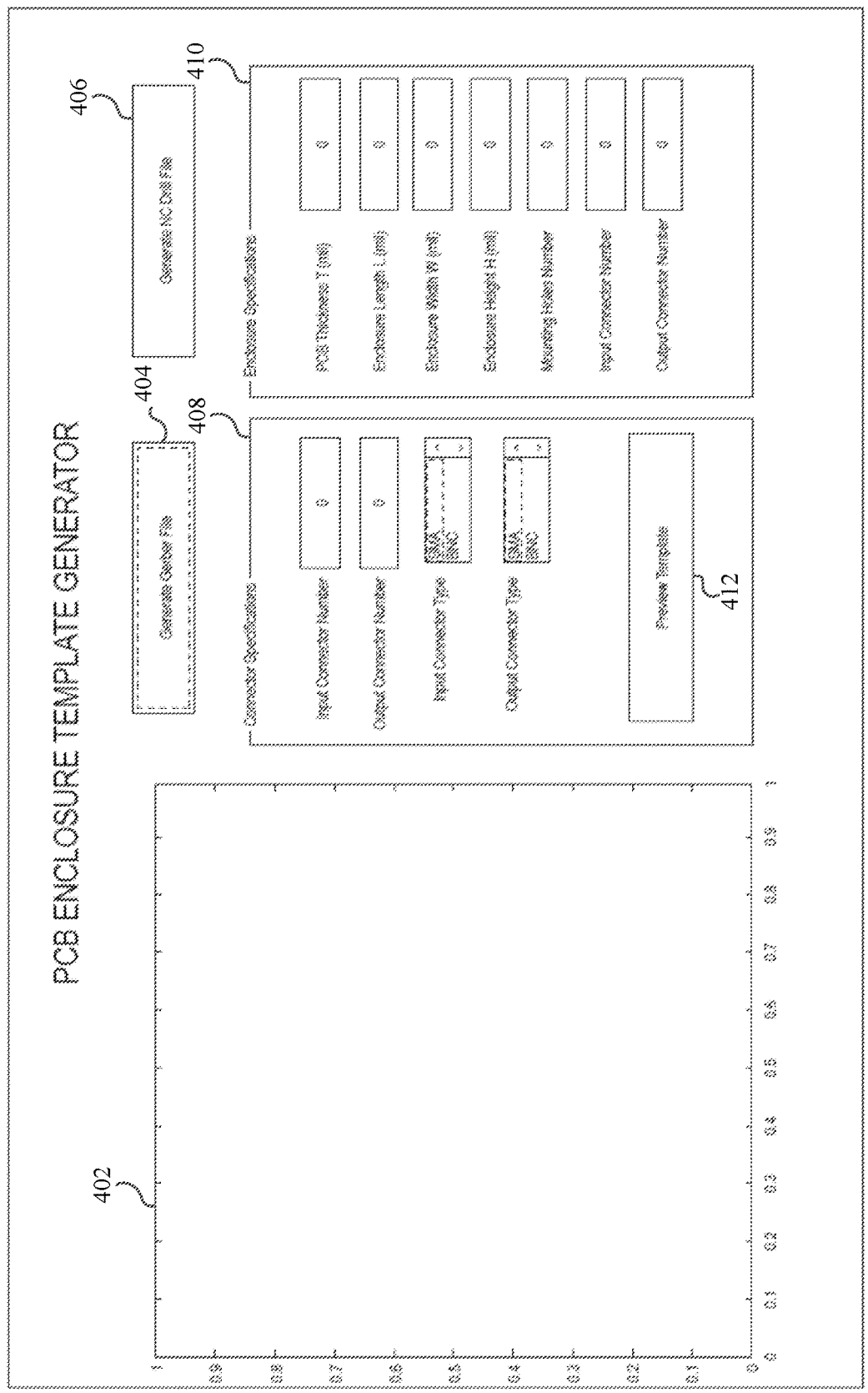
FIG. 4 depicts a user interface for a PCB enclosure template generator, according to an embodiment.

Template generator 102 may generate and render a graphical user interface in various ways. For example, FIG. 4 depicts a user interface 400 for a PCB enclosure template generator, such as template generator 102 of FIG. 1. For instance, user interface 400 may include a window 402 for previewing a template generated based on user inputs. Preview template button 412 may be used to activate this previewing function. The user inputs may include connector specifications such as an input connector number, an output connector number, an input connector type (e.g., SMA or BNC), or an output connector type (e.g., SMA or BNC), etc. These connection specifications may be entered in window 408 of user interface 400. The user inputs may further include enclosure specifications that may be entered in window 410, such as a PCB thickness, an enclosure length, an enclosure width, an enclosure height, a mounting holes number, an input connector number, and an output connector number. Button 404 may be selected to generate a Gerber file, and button 406 may be selected to generate an NC drill file. In an embodiment, one button may be used to generate all necessary files for fabrication.

While template generator 200 allows for many types of information to be entered, in some designs, certain information may not apply. If the information is not relevant for a particular scenario, then the associated fields for such information may be left empty or made inactive. In an embodiment, connectors may not be necessary, information about connectors are therefore not needed to complete the PCB/enclosure design. For example, power connectors may not be needed when an internal rechargeable power source is incorporated into the enclosure.

FIG. 5 depicts an example manufacturing file 500 that is a Gerber photo plotter file. Gerber files may contain the details a fabricator needs to know about the individual layers of the PCB/enclosure. Specifically, each Gerber file may correspond to a particular layer of the PCB/enclosure, each of which may have a unique file extension. Example layers and the associated Gerber file extensions for Altium Designer® include inner layer (.g1, .g2, etc.), inner plane (.gp1, gp2, etc.), bottom layer (.gbl), bottom overlay/silk screen (.gbo), bottom solder mask (.gbs), drill drawing (.gd1, .gd2, etc.), drill guide (.gg1, .gg2, etc.), keep out layer (.gko), mechanical layer (.gm1, gm.2, etc.), pad master bottom (.gpb), pad master top (.gpt), top layer (.gt1), top overlay or silk screen (.gto), top solder mask (.gts), top paste (.gtp), and Gerber panel (.p01, p02, etc.). The file extensions may be dependent on the software and/or software version used to generate the PCB/enclosure.

In an embodiment, the user input provided to enclosure template generator 102 of FIG. 1, may be used to generate manufacturing file(s), such as manufacturing file 500. The manufacturing file(s) may be manipulated with PCB design software to incorporate a circuit design or modify specific aspects of the associated enclosure template, such as templates 600, 700, 800 and 900 shown in FIGS. 6-9.

Figure 6:
FIG. 6 depicts a template of an enclosure, according to an embodiment.

FIG. 6 depicts a template 600 of an enclosure, according to an embodiment. Template 600 includes four identical pieces 602, 604, 606, and 608. These four pieces may form the sides of a rectangular three dimensional structure when assembled. Layout 600 may also include two additional pieces, 610 and 612, that may form the ends (e.g., front and back or top and bottom) of the three dimensional structure when assembled. This is merely an example design. Many other designs may be possible with pieces having different shapes. For example, another design may include side pieces that are rectangular with rectangular cut outs at the four corners. Yet another design may include a cube with square pieces rather than rectangular pieces.

Figure 7:
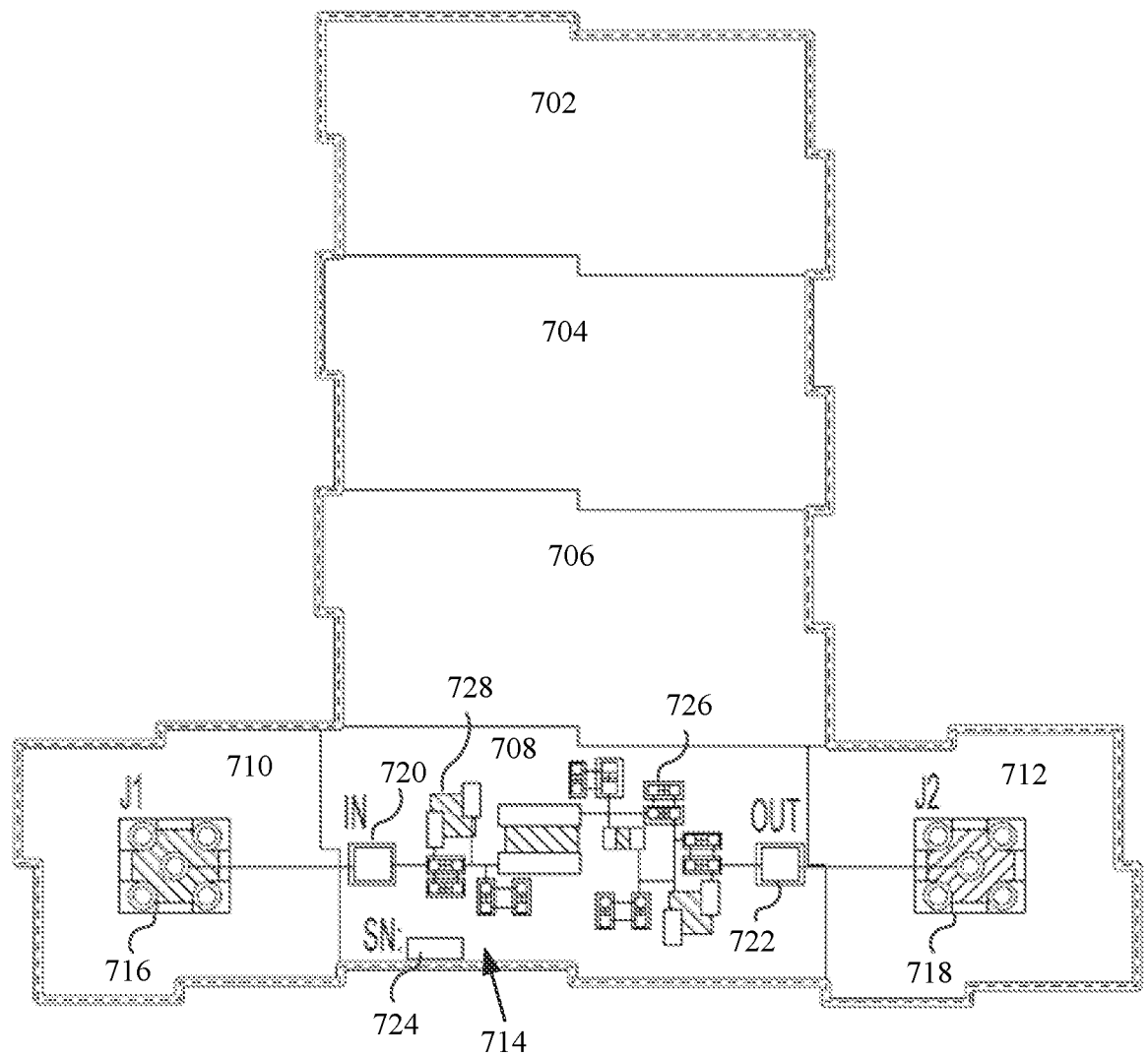
FIG. 7 depicts a template of an enclosure that has an incorporated circuit board, according to an embodiment.

FIG. 7 depicts a template 700 of an enclosure that has an incorporated circuit board, according to an embodiment. Template 700 is shown as a design view of an enclosure and circuit layout using a PCB software (e.g., Altium Designer®). Similar to template 600 shown in FIG. 6, template 700 includes multiple pieces 702, 704, 706, 708, 710 and 712 configured to form the faces of the enclosure once assembled. The difference here is that layout 700 includes an embedded circuit 714. Circuit 714 may be any type of circuit (e.g., a filter circuit). Circuit 714 may include component 726 and component 728, as well as an input connector 720 and an output connector 722. In addition, circuit 714 may include an optional label 724 that may be used to indicate a serial number, a version number, a name, etc. Template 700 may include an input connector 716 and an output connector 718 on pieces 710 and 712, respectively. Template 700 may include any number of input and/or output connectors on any suitable surface, for example, any of pieces 702, 704, 706, 708, 710 and 712. Similarly, circuit 714 may include any number of input and output connectors that may be associated with connectors of the enclosure, for example, connectors 716 and 718. These connectors may be any type of connectors (e.g., SMA or BNC).

Figure 8:
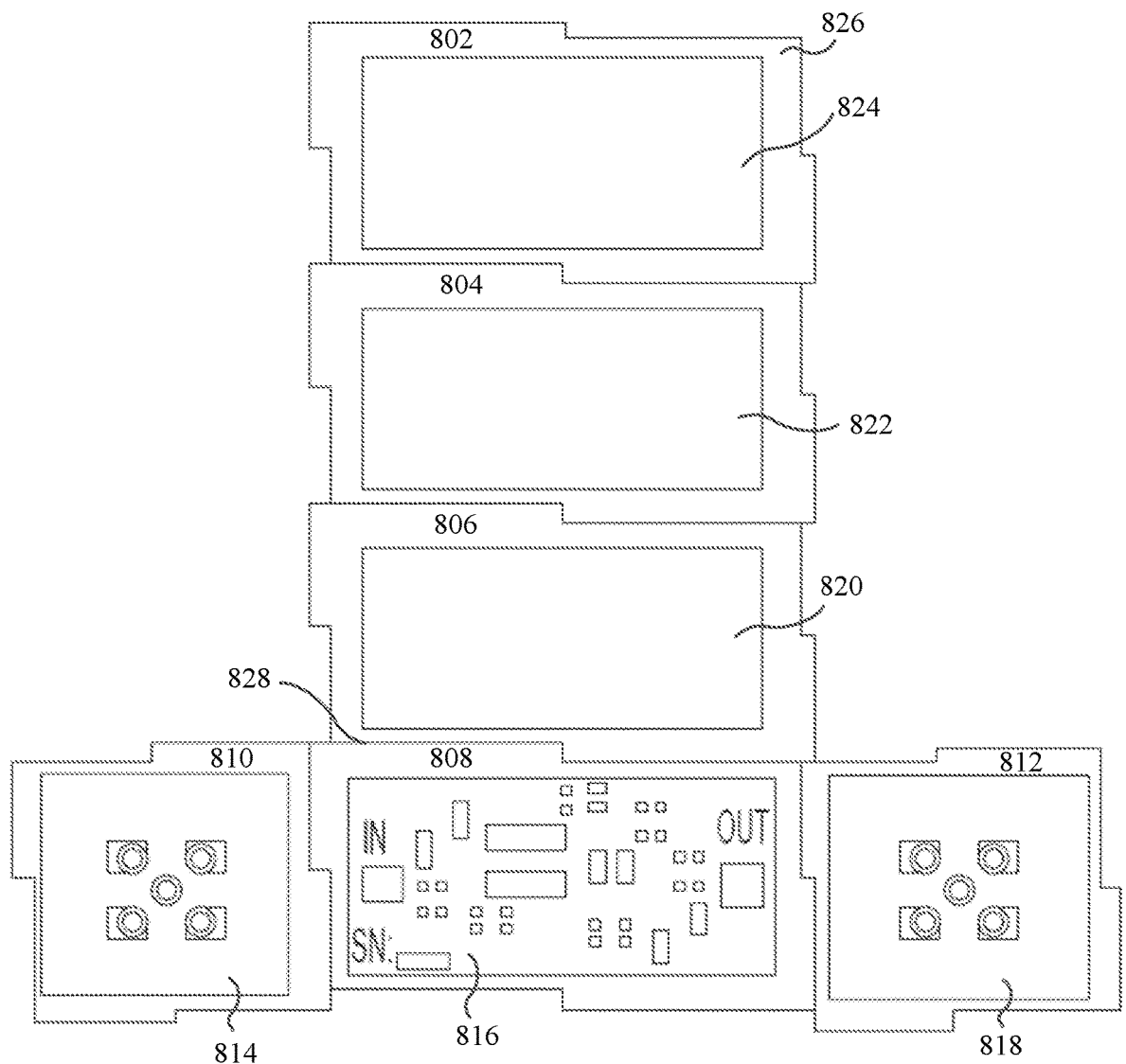
FIG. 8 depicts another template of an enclosure that includes an overlay layer, according to an embodiment.

FIG. 8 depicts a template 800 of an enclosure that includes an overlay layer on the internal surfaces of the enclosure, according to an embodiment. For example, template 800 may be an implementation of template 700 with all the same components and features with the addition of an overlay layer on one or more internal surfaces, and over any embedded circuit(s), of the enclosure. For example, template 800 includes multiple pieces 802, 804, 806, 808, 810 and 812 configured to form faces of the enclosure once assembled. In addition, template 800 includes overlay layers 814, 816, 818, 820, 822, and 824. The overlay layers may include a solder mask and/or a silkscreen layer and are configured to insulate metal traces from accidental contact with other metal, solder or conductive material. This layer may also include letters, numbers, symbols, graphical objects or textual information. Aesthetic appeal, product identification and branding may be important in some applications. In an embodiment, the interior surfaces of the enclosure may include an overlay where a label or logo may be placed for such purposes. In addition, an overlay may minimize copper exposure, thereby reducing oxidation. In another embodiment, text and graphical objects (e.g., brand, serial numbers, designators, etc.) may be rendered on another layer in addition to or rather than on the silkscreen layer. For example, text and graphical objects may be placed on the top copper layer and/or the bottom copper layer as allowed by the PCB/enclosure design, such as when there is adequate space and RF compatibility. When the silkscreen layer is not used, its cost may be eliminated in mass production.

Besides the areas overlaid with the overlay layers, template 800 may include exposed copper areas, such as area 826 shown in FIG. 8, for assembly and solder placement. In addition, template 800 may include routing guidelines, such as guideline 828, to show where each face may be cut to facilitate separation of the pieces during the assembly process.

Figure 9:
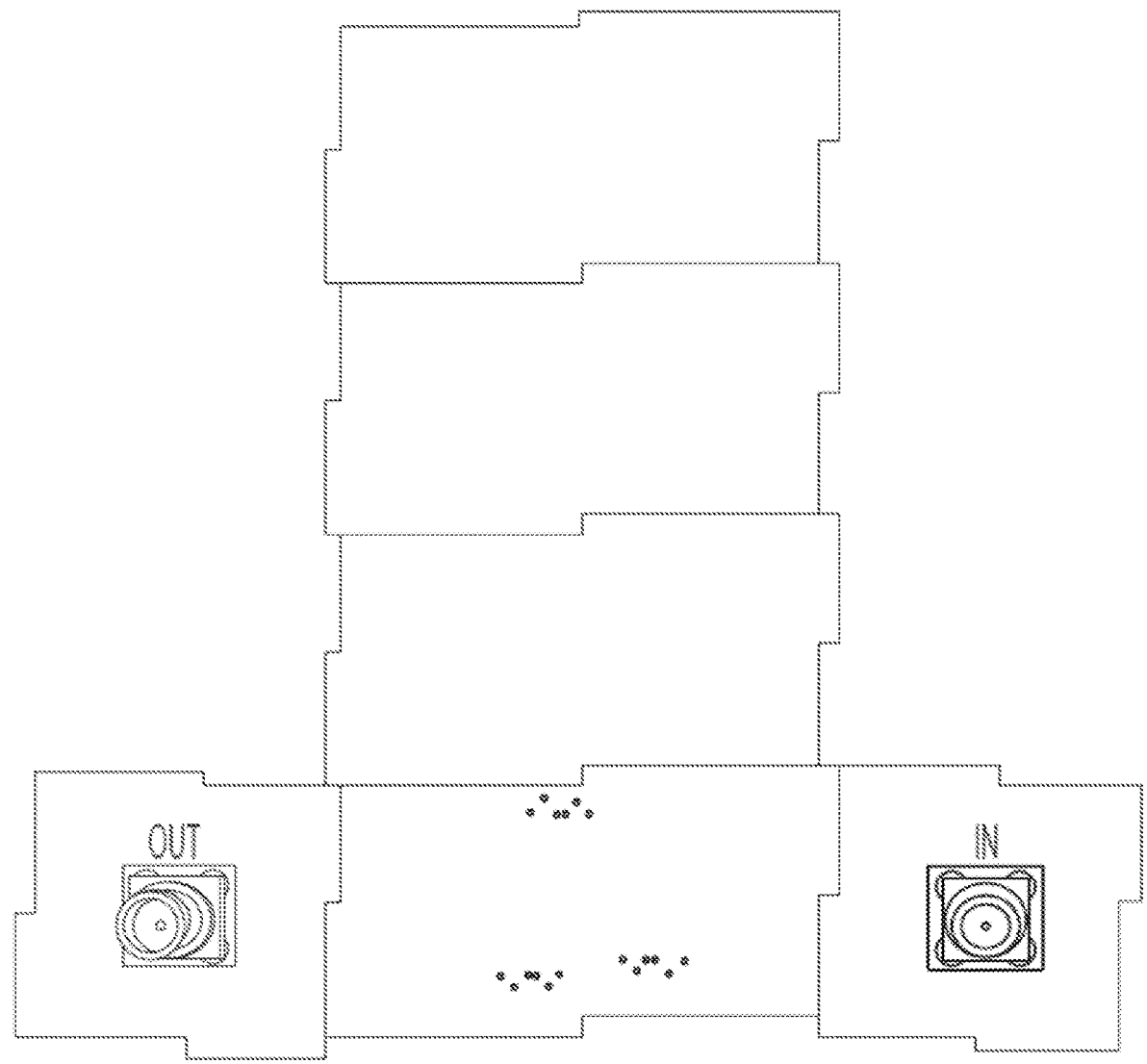
FIG. 9 depicts another template of an enclosure that has an embedded circuit board, according to an embodiment.

FIG. 9 depicts a template 900 of an enclosure that has an embedded circuit, according to an embodiment. Template 900 is shown as a layout view of the outside (external sides) of the enclosure with input and output connectors.

Figure 10:
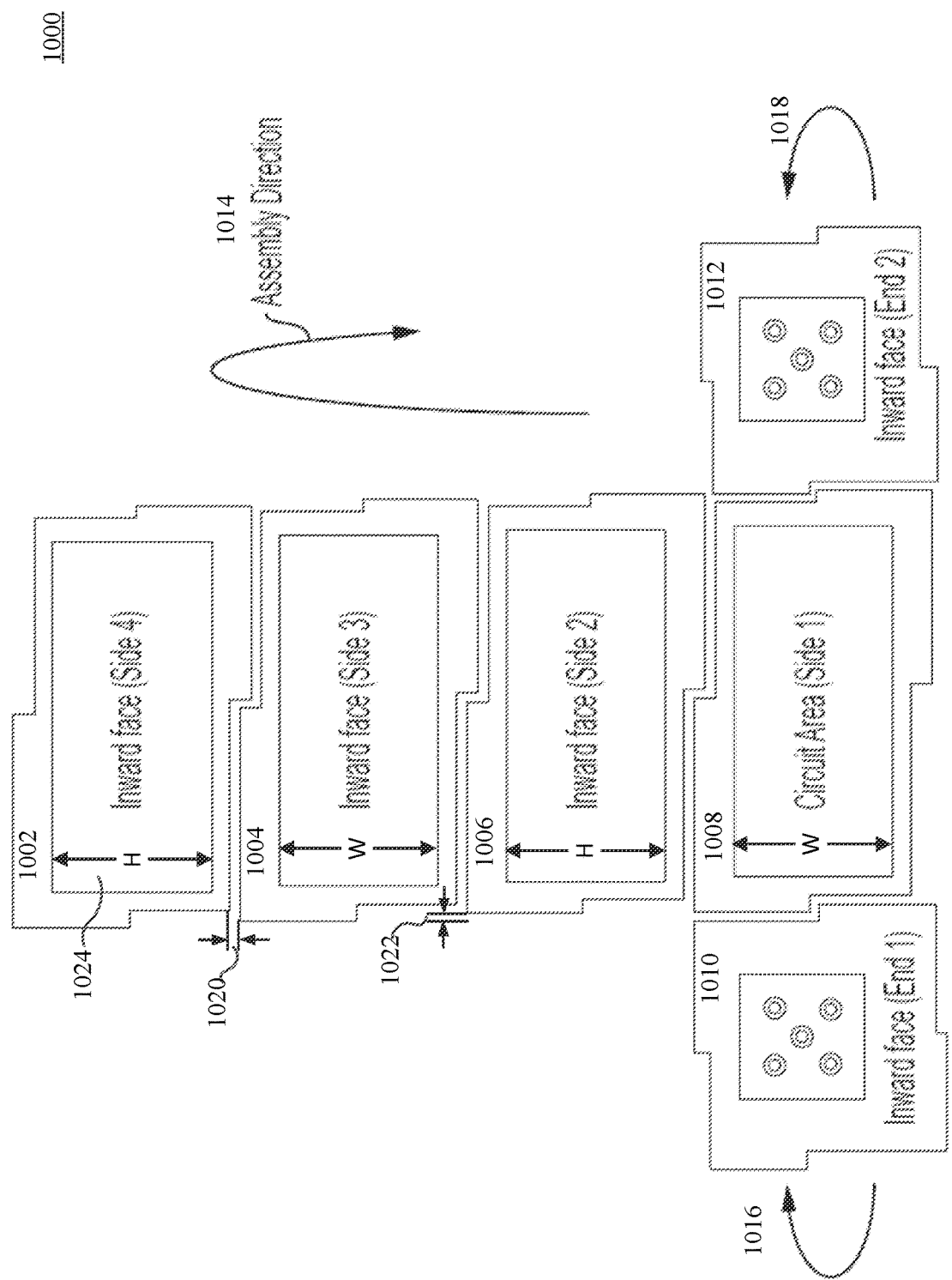
FIG. 10 depicts a template of an enclosure for assembly, according to an embodiment.

FIG. 10 depicts a template 1000 of an enclosure for assembly, according to an embodiment. Similar to the templates shown in previous figures, template 1000 includes multiple pieces 1002, 1004, 1006, 1008, 1010 and 1012 configured to form the faces of the enclosure once assembled. Pieces 1002, 1004, 1006 and 1008 are assembled together along assembly direction 1014 to form a rectangular box. Then piece 1010 is assembled along assembly direction 1016 to form a first face, and piece 1012 is assembled along assembly direction 1018 to form a second, opposite face of the enclosure, thereby creating a completely closed structure. The pieces may be soldered together with solder fillet to form the enclosure as a three-dimensional shielded structure, where the solder fillet provides all-around continuous grounding and structural integrity for the enclosure.

As shown in FIG. 10, spacing 1020 between pieces 1002, 1004, 1006 and 1008 may depend on the thickness (T) of the PCB, for example, 1.5T being the maximum value for spacing 1020. Similarly, spacing 1022 between pieces 1010 and 1012 may also be dependent on the thickness of the PCB, for example, 1.5T being the maximum value for spacing 1022. Furthermore, the area inside each face of the enclosure available for circuit placement and/or overlay may also depend on a parameter of the PCB. For example, pieces 1004 and 1008 may have a side (e.g., width) that is dependent on a width (W) of the PCB. Pieces 1002 and 1006 may have a side (e.g., width) that is equal to the height of the enclosure, the height being an independent value. The values of the spacing, lengths, widths, and/or areas may vary with different designs, and may or may not have the same dependencies as set forth here.

Figure 11:
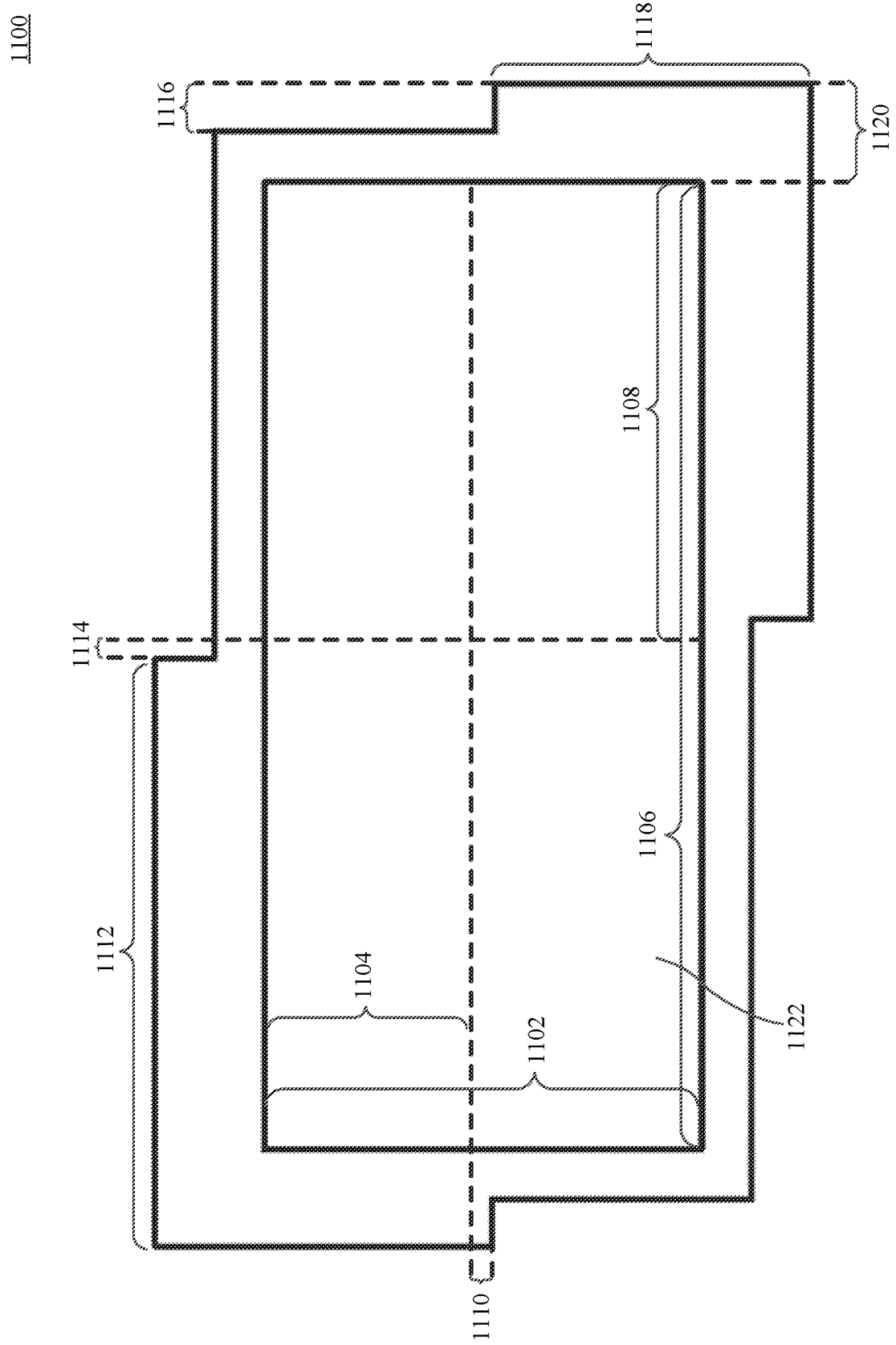
FIG. 11 depicts a face of an enclosure, according to an embodiment.

FIG. 11 depicts a face 1100 of an enclosure, according to an embodiment. In this embodiment, face 1100 may have an area 1122 usable to embed a circuit and/or an overlay area. Face 1100 may have dimensions that are independent or dependent on a parameter of an incorporated PCB/enclosure. Such parameter may include a PCB thickness (T), a height (H) of the enclosure, a width (W) of the PCB, a length (L) of the PCB. For an enclosure that is a cube, the height, length and width may all be the same value, i.e., H=L=W. As shown in FIG. 11, area 1122 may have a length 1106 that is equal to the length of the PCB. Area 1122 also may have a width 1102 that is equal to the width of the PCB. Distance 1104 may have a value that is half of the width of the PCB, i.e., 0.5W. Distance 1108 may have a value that is half of the length of the PCB, i.e., 0.5L. Distances 1110 and 1114 may be dependent on the thickness of the PCB, each having a value of 0.5T. Similarly, distance 1116 may also be dependent on the thickness of the PCB, having a value of 1.5T. Distance 1120 may also be dependent on the thickness of the PCB, having a value of 2.5T. Distance 1112 may have a value that is dependent on both the length and the thickness of the PCB, according to the following equation, (L+3T)/2. Distance 1112 may have a value that is dependent on both the width and the thickness of the PCB, according to the following equation, 0.5W+2T.

FIGS. 12A-12F depict assembly stages of an enclosure 1200, according to an embodiment. Enclosure 1200 may be an implementation of any enclosure depicted in FIGS. 6-10. FIGS. 12A, 12C, 12E and 12G depict the exterior or outside view of enclosure 1200, whereas FIGS. 12B, 12D, and 12F depict the interior or inside view of enclosure 1200.

FIG. 12A depicts enclosure 1200 being assembled with a side piece 1202, an end piece 1204, and an end piece 1206. Each of end piece 1204 and end piece 1206 includes a connector. End piece 1206 may be connected to side piece 1202 with solder fillet 1208 on the outside, along the width of side piece 1202.

FIG. 12B also depicts enclosure 1200 being assembled with side piece 1202, end piece 1204, and end piece 1206. End piece 1206 may be connected to side piece 1202 with solder fillet 1210 on the inside, along a width of side piece 1202.

FIG. 12C depicts enclosure 1200 being assembled with a side piece 1212 in addition to side piece 1202, end piece 1204, and end piece 1206. End piece 1204 may be connected to side piece 1212 with solder fillet 1214 on the outside, along a width of side piece 1212. Side piece 1202 may be connected to side piece 1212 with solder fillet 1216 on the outside, along a length of side piece 1202 and side piece 1212.

FIG. 12D depicts enclosure 1200 being assembled with side piece 1212, side piece 1202, end piece 1204, and end piece 1206. End piece 1204 may be connected to side piece 1212 with solder fillet 1218 on the inside, along a width of side piece 1212. Side piece 1212 may be connected to side piece 1202 with solder fillet 1220 on the inside, along a length of side piece 1202 and side piece 1212.

FIG. 12E depicts enclosure 1200 being assembled with a side piece 1222, side piece 1212, side piece 1202 (not shown in FIG. 12E) end piece 1204, and end piece 1206. End piece 1204 may be connected to side piece 1222 with solder fillet 1226 on the outside, along a width of side piece 1222. Side piece 1222 may be connected to side piece 1202 with solder fillet 1224 on the outside, along a length of side piece 1202 and side piece 1222.

FIG. 12F depicts enclosure 1200 being assembled with side piece 1222, side piece 1212, side piece 1202, end piece 1204, and end piece 1206. End piece 1204 may be connected to side piece 1222 with solder fillet 1228 on the inside, along a width of side piece 1222. Side piece 1222 may be connected to side piece 1202 with solder fillet 1230 on the inside, along a length of side piece 1202 and side piece 1222.

FIG. 12G depicts enclosure 1200 being assembled with a side piece 1232 in addition to side piece 1222, end piece 1206 and end piece 1204 (not clearly depicted in FIG. 12G). End piece 1202 may be connected to side 1232 with solder fillet 1236, on the outside, along a width of side piece 1232. Furthermore, end piece 1206 may be connected to side 1232 with solder fillet 1238, on the outside, along a width of side piece 1232. Side piece 1232 may be connected to side 1212 with solder fillet 1234, on the outside, along a length of side piece 1232 and side piece 1212. Side piece 1232 may further be connected to side 1222 with solder fillet 1238, on the outside, along a length of side piece 1232 and side piece 1222.

As can be seen in FIGS. 12A-12G, solder fillet may be placed along the sides of each face of enclosure 1200. The solder fillet may extend along the entirety of the side or only partially. Solder fillet placement may depend on the particular design and/or shapes of the pieces as well as the application of the PCB/enclosure.

In an embodiment with one or more non-embedded circuit boards to be placed in an enclosure, the enclosure may be partially assembled, the circuit board(s) be mounted inside the enclosure, and then the assembly of the enclosure may be completed as shown in FIGS. 12A-12G. For example, a circuit board may be incorporated into such enclosure via standoffs. Standoffs may be used to secure a circuit board to the enclosure, and may be made of plastic or metal with male or female ends. The circuit board may be placed on a base plate prior to attachment to the enclosure. The standoffs may be attached directly on the base plate, thereby ensuring a space between the circuit board and the face/wall of the enclosure to prevent parts from accidental contact, to avoid shorts, etc. Sometimes, it may be desirable to test several non-embedded circuit boards with a particular enclosure. In such cases, a non-embedded circuit board may be inserted into the enclosure, and rather than applying the solder fully, the solder may be strategically applied such that the solder may be easily removed to replace the non-embedded circuit board.

In an embodiment with one or more connectors on the circuit board and/or on the face(s) of the enclosure, electrical connections may be made between circuit boards and/or connectors. Such electrical connections may be made by any means, such as metal traces or wires. In an embodiment, electrical connections may be made with appropriately placed metal traces and solder fillets on the faces associated with the circuit boards and/or the faces associated with the connectors. For example, a PCB enclosure may include a first face having a PCB, and a second face having connector (s). The first face may include a first trace and the second face may include a second trace, the first trace and the second trace being configured to form an electrical connection when the first face and the second face are assembled together. The electrical connection may be a signal connection or a power connection.

Example Computer System Implementation

Each of template generator 102, PCB design environment 104, and user interface 400 and flowcharts 200 and 300 may be implemented in hardware, or hardware combined with software or firmware. For example, template generator 102, PCB design environment 104, and user interface 400, and flowcharts 200 and 300 may be implemented as computer program code/instructions configured to be executed in one or more processors and stored in a computer readable storage medium. Alternatively, template generator 102, PCB design environment 104, and user interface 400, and flowcharts 200 and 300 may be implemented as hardware logic/electrical circuitry.

The terms "computer program medium," "computer-readable medium," and "computer-readable storage medium" are used herein to refer to physical hardware media such as the hard disk associated with a storage device. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

In an embodiment, template generator 102, PCB design environment 104, and user interface 400 may be implemented in a system-on-a-chip (SoC). The SoC may include an integrated circuit that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
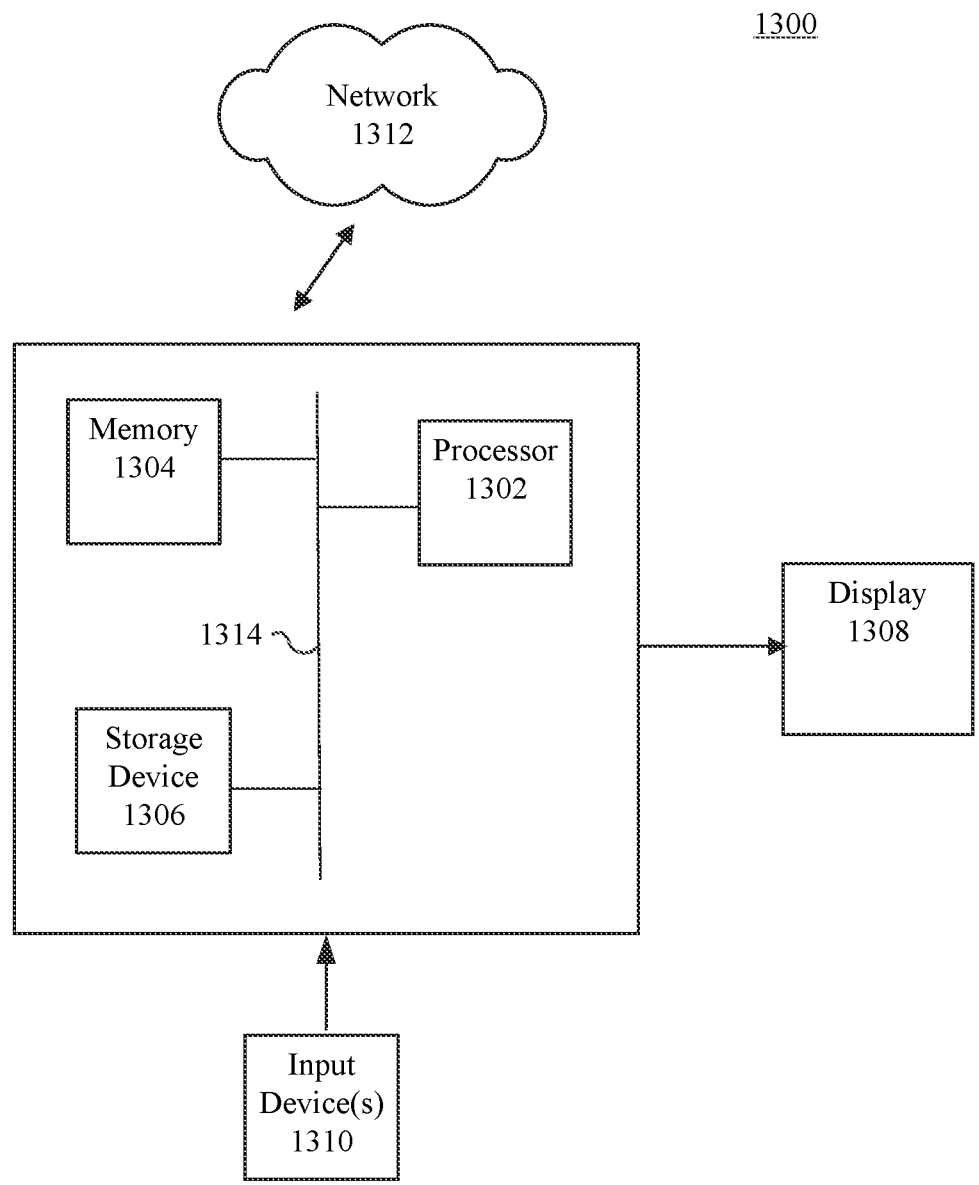
FIG. 13 is a block diagram of an example computer system in which embodiments may be implemented.

FIG. 13 is a block diagram of an example computer system in which embodiments may be implemented. The description of computing device 1300 is provided for purposes of illustration, and is not intended to be limiting. Embodiments may be implemented in further types of computer systems, as would be known to persons skilled in the relevant art(s).

As shown in FIG. 13, computing device 1300 includes processor 1302, memory 1304, and storage device 1306. These components may be coupled together via a bus 1314.

Processor 1302 may be referred to as a processor circuit or a processing unit. Processor 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor 1302 may execute program code stored in a computer readable medium, such as program code of an operating system, an application program, and other programs.

Memory 1304 includes any system memory, for example, read only memory (ROM) and random access memory (RAM) and may store a basic input/output system (e.g., BIOS).

Storage device 1306 may include any a hard disk drive, a magnetic disk drive, an optical disk drive, a removable optical disk (e.g., CD ROM, DVID ROM), a flash memory card, a digital video disk, RAMs, ROMs, or other hardware storage media. Storage device 1306 and its associated computer readable media provide nonvolatile storage of computer-readable instructions, data structures, program modules and other data for computing device 1300.

A number of program modules may be stored on memory 1304 and/or storage device 1306. These programs include an operating system, an application program, other programs, and program data. Such an application program or other programs may include, for example, computer program logic (e.g., computer program code or instructions) for implementing system components and/or embodiments described herein.

A user may enter commands and information into the computing device 1300 through input devices 1310 such as a keyboard and a pointing device. Other input devices (not shown) may include a microphone, joystick, game pad, satellite dish, scanner, touch screen and/or touch pad, voice recognition system to receive voice input, gesture recognition system to receive gesture input, or the like. These and other input devices are often connected to processor 1302 through a serial port interface that is coupled to bus 1314, but may also be connected by other interfaces, such as a parallel port, game port, or a universal serial bus (USB).

A display 1308 is also connected to bus 1314 via an interface, such as a video adapter. Display 1308 may be external to or incorporated in computing device 1300. Display 1308 may display information, as well as being a user interface for receiving user commands and/or other information (e.g., by touch, finger gestures, virtual keyboard, etc.). In addition to display 1308, computing device 1300 may include other peripheral output devices (not shown) such as speakers and printers.

Computing device 1300 is connected to a network 1312 (e.g., the Internet) through an adaptor or network interface, a modem, or other means for establishing communications over the network.

CONCLUSION

While various embodiments of the disclosed subject matter have been described above, it should be understood that they have been presented by way of example only, and not limitation. Various modifications and variations are possible without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method for producing a modular printed circuit board enclosure, comprising:
   inputting an enclosure parameter into a template generator to generate a manufacturing file associated with an enclosure template;
   based upon determining that the manufacturing file is to be modified to incorporate a printed circuit board into the enclosure,
      importing the manufacturing file into a printed circuit board design environment;
      generating a modified manufacturing file based on information relating to a printed circuit board; and
      providing the modified manufacturing file to a fabricator for fabricating the enclosure.

2. The method of claim 1, wherein the template generator comprises a compiled or an interpreted general purpose computer language script.

3. The method of claim 1, wherein the enclosure parameter comprises one of a printed circuit board thickness, an enclosure length, an enclosure width, an enclosure height, a mounting holes number, an input connector number, an output connector number, an input connector type, or an output connector type.

4. The method of claim 3, wherein the enclosure height is an independent variable selected by a designer of the enclosure.

5. The method of claim 1, wherein the manufacturing file is configured to be modified as often as needed to accommodate a change in at least a dimension of the enclosure or a dimension of the printed circuit board.

6. The method of claim 1, wherein the generating the modified manufacturing file comprises modifying the manufacturing file to indicate mounting points on a face of the enclosure corresponding to mounting points on the printed circuit board that is to be inserted into the enclosure post fabrication.

7. The method of claim 1, wherein the generating the modified manufacturing file comprises modifying the manufacturing file to embed a circuit layout of the printed circuit board onto an internal face of the enclosure.

8. The method of claim 1, wherein the fabricated enclosure comprises a matrix that includes a plurality of pieces with routing guidelines between the pieces, each piece corresponding to a face of the enclosure.

9. The method of claim 8, further comprising assembling the fabricated enclosure by
   separating the plurality of pieces from the matrix along the routing guidelines; and
   soldering the pieces together with solder fillet to form the enclosure as a three-dimensional shielded structure, wherein the solder fillet provides continuous grounding and structural integrity for the enclosure.

* * * * *